A. C. DOUGLASS.
SEPARABLE REVERSIBLE BEE TRAP.
APPLICATION FILED APR. 1, 1913.

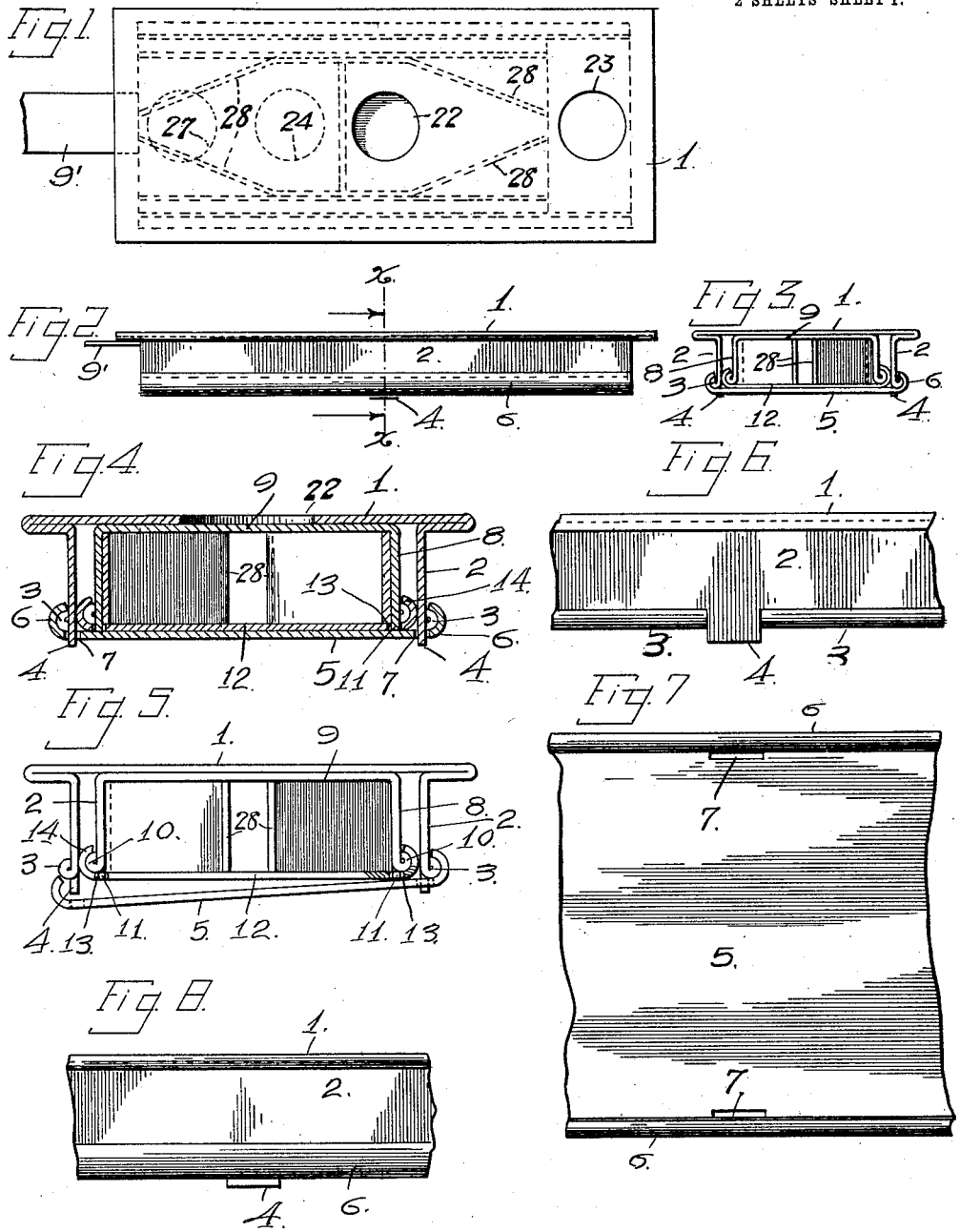

1,113,886.

Patented Oct. 13, 1914.
2 SHEETS—SHEET 2.

WITNESSES.

INVENTOR.
Andrew C. Douglass.
By Arthur L. Slee.
HIS ATTY.

UNITED STATES PATENT OFFICE.

ANDREW C. DOUGLASS, OF SONOMA, CALIFORNIA.

SEPARABLE REVERSIBLE BEE-TRAP.

1,113,886.  Specification of Letters Patent.  Patented Oct. 13, 1914.

Application filed April 1, 1913. Serial No. 759,263.

*To all whom it may concern:*

Be it known that I, ANDREW C. DOUGLASS, a citizen of the United States, and a resident of the city and county of Sonoma and State of California, have invented a new and useful Improvement in Separable Reversible Bee-Traps, of which the following is a specification.

My invention relates to reversible bee traps as described and claimed in my application filed October 24th, 1912, Serial Number 728,505, wherein a reciprocating slide, having apertures therein, is arranged to be inserted between the upper and lower compartments of a beehive, and the objects of my invention are first, to provide improved means whereby access may be had to either compartment without exposing the operator to the danger of being stung by the bees within the hive; second, to provide means whereby the bee trap may be separated or taken apart for cleaning purposes.

As the bees gather honey from the blossoms a portion of the honey within the blossom adheres to the pubescent legs of the bee, which honey coadunates with the pollen of the blossoms and forms a viscous deposit which is transferred to the floor of the bee trap when the bees walk thereon. As the viscous deposit accumulates on the floor of the bee trap it interferes with the proper operation of the slidable portion thereof as well as with the proper operation of the converging wings.

In order to overcome this disadvantage, I have invented the separable, reversible bee trap hereinafter described and claimed in the following specification, wherein like numerals of reference designate similar parts throughout the said specification and drawings, and in which—

Figure 9:
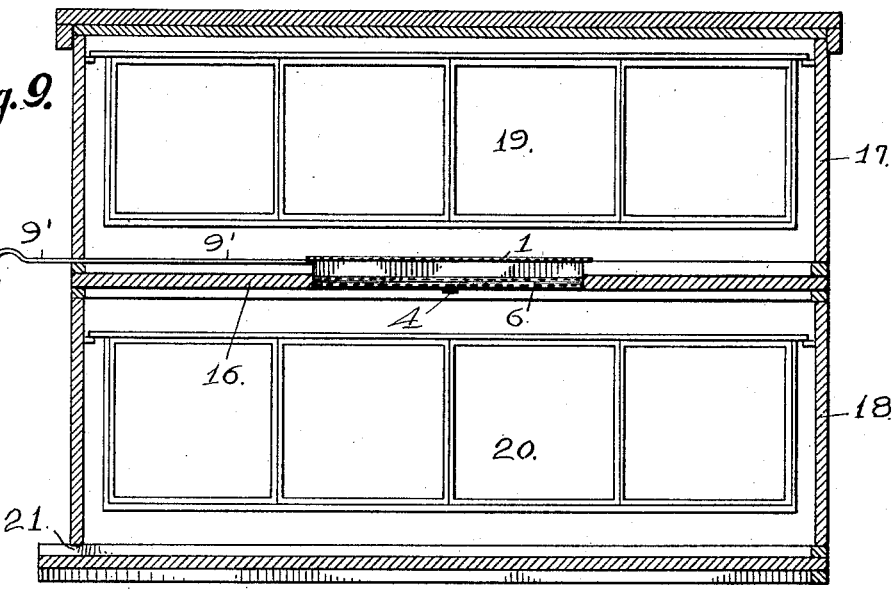
Figure 10:
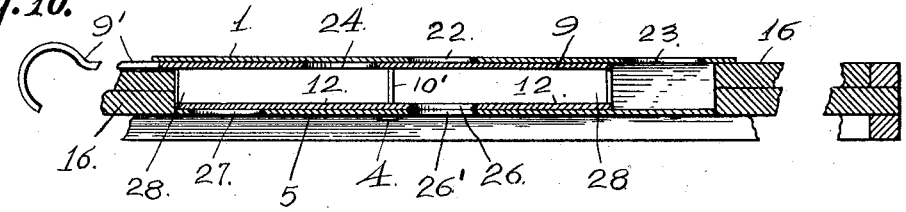
Figure 11:
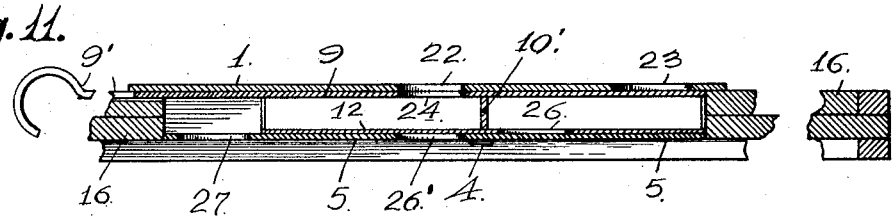

Figure 1 is a plan view of the trap removed from the bee hive. Fig. 2 is a side elevation thereof. Fig. 3 is an end elevation of Fig. 1. Fig. 4 is a sectional view on an enlarged scale taken on line X—X of Fig. 2. Fig. 5 is an end elevation on an enlarged scale showing the bottom of the outer casing partly removed. Fig. 6 is a broken side elevation of the outer casing disclosing one of the retaining lugs. Fig. 7 is a partial view of the bottom of the outer casing disclosing the apertures for the reception of the retaining lugs. Fig. 8 is a view similar to Fig. 6 with a portion of the bottom of the outer casing in position. Fig. 9 is a vertical sectional view of a bee hive disclosing the central partition or floor and the reversible bee trap secured therein. Fig. 10 is a broken sectional view of the trap and a portion of the partition or floor disclosing the trap set in a position where the bees may go from the lower to the upper compartment, and Fig. 11 is a view similar to Fig. 10 but disclosing the reverse position of the trap whereby the bees may go from the upper to the lower compartment, but not from the lower to the upper.

The usual bee hive is composed of two sections 17 and 18 having the upper or honey compartment 19 and the lower or brooding compartment 20. In the present invention the compartments 19 and 20 are separated by means of the inserted floor 16 within the approximate center of which is the trap hereinafter described. The bees enter at the horizontal opening 21 in the lower compartment 20 and may only proceed to the upper compartment 19 through the trap.

The outer casing 1 of the trap is provided with the depending sides 2, the said sides 2 being provided at the lower edges thereof with the laps 3 excepting at the central portions of the said depending sides where the edge is not lapped so as to form the lugs 4. The bottom 5 is provided with the rolled edges 6 and the apertures 7 which are arranged to engage the lugs 4 of the casing 1 so as to prevent longitudinal movement of the said bottom when the rolled edges 6 thereof are sprung over and engaged by the laps 3 of the said outer casing 1. Similarly, the reciprocating slide 9 is provided with the depending sides 8 which are also lapped as at 10 excepting in the central portion thereof where the lugs 11 occur. The bottom 12 of the reciprocating slide 9 is provided with the rolled edges 14 which engage the laps 10 of the slide 9, and the apertures 13 which are provided for the reception of the lugs 11. The lugs 4 and 11 are provided to prevent the longitudinal movement of the bottoms 5 and 12, on the casing 1 and 9 respectively, when the viscous deposits accumulate sufficiently to cause the said bottoms to adhere to each other.

In addition to the above construction of the separable bee trap the upper surface of the casing 1 is provided with the apertures 22 and 23 while the bottom 5 of the said casing 1 is provided with similar apertures 27 and 26′. Likewise, the slide 9 is provided with the aperture 24 in the top thereof and the bottom 12 of the said slide 9 is provided with an aperture 26. The slide 9 is divided into two compartments by means of the partition 10′. Flexible wings 28 are secured to each side of the partition 10′ and converge toward each other near the ends of the slide 9 so that a bee may force its way through the said flexible wings 28 from the inside of the trap but may not enter the trap from the ends, for the reason that such an attempt would force the ends of the flexible wings together and prevent the entrance of the bee.

While the slide 9 is at one end of the trap as disclosed in Fig. 10, the apertures 26 and 26′ coincide, the aperture 23 is open and the aperture 22 is covered by the slide 9. Also the aperture 24 of the slide 9 is covered by the upper portion of the casing 1 and the aperture 27 is covered by the slide 9. Consequently, a bee may enter the slide 9 through the coinciding apertures 26 and 26′, force its way through the converging wings 28, and enter the upper compartment through the open aperture 23. When the slide 9 is moved, by means of the extension 9′ thereof, to the other end of the casing 1, as illustrated in Fig. 11 of the drawings, the apertures 26′ and 23 are closed, the aperture 27 is uncovered and the aperture 24 coincides with the aperture 22. The bees may now enter the slide 9 through the coinciding apertures 24 and 22 only, and after forcing their way through the converging wings 28 enter the bottom compartment 20 of the hive through the aperture 27.

While the slide 9 is in the position indicated in Fig. 10 of the drawings, the bees enter the coinciding apertures 26 and 26′ and walk on the bottom 12 and the exposed portion of the bottom 5 between the end of the slide 9 and the end of the said floor or bottom 5. The bottoms mentioned consequently become covered with the hereinbefore mentioned deposits of pollen and honey which is viscous and causes the slide 9 to stick to the casing 1. The converging wings also receive a portion of the deposit to such an extent that the wings become fixed and the bees cannot force their way through the said wings. By removing the bottom 5 from the casing 1 and the bottom 12 from the slide 9, the separate pieces may be readily cleaned as well as the converging wings 28 and then returned to their positions.

Having thus described my invention, what I claim as new and desire to secure by Letters Patent is—

1. A reversible bee trap comprising a casing having a removable bottom secured thereto and apertures within the said casing and bottom; and a reciprocating slide within the casing having converging wings and a removable bottom secured thereto, and apertures within the said slide and removable bottom, adapted to register with the apertures within the casing and removable bottom secured thereto for the purpose of permitting passage through the slide and converging wings therein in one direction only when the said slide is in one end of the casing and to permit passage in the opposite direction only when the slide is in the other end of the casing.

2. A reversible bee trap comprising a casing having a removable bottom secured thereto and apertures within the said casing and bottom; a reciprocating slide within the casing having converging wings and a removable bottom secured thereto and apertures within the said slide and removable bottom adapted to register with the apertures within the casing and the removable bottom secured thereto for the purpose of permitting passage through the slide and the converging wings therein in one direction only when the said slide is in one end of the casing and to permit passage through the said slide in the opposite direction only when the slide is in the other end of the casing; and means for moving the slide from one end of the casing to the other.

3. In a reversible bee trap, the combination of a casing having apertures therein and depending sides whose lower edges are provided with projections; a bottom having apertures therein and adapted to engage the projections on the lower edges of the casing; a reciprocating slide within the casing having converging wings and apertures therein and depending sides whose lower edges are provided with projections; a bottom having apertures therein and adapted to engage the projections on the lower edges of the reciprocating slide the said apertures within the slide and the bottom secured thereto being adapted to register with the apertures within the casing and the removable bottom secured thereto for the purpose of permitting passage through the slide and the converging wings therein in one direction only when the said slide is in one end of the casing and to permit passage through the said slide in the opposite direction only when the slide is in the other end of the casing; an extension integral with the upper portion of the reciprocating slide adapted to move the said slide from one end of the casing to the other; and means for retaining the bottom against longitudinal movement on the casing and the slide.

4. In a reversible bee trap the combination of a casing having apertures therein and depending sides provided at the lower edges thereof with lateral projections and central lugs; a bottom having apertures therein and adapted to engage the lateral projections and the lugs on the lower edges of the casing; a reciprocating slide having apertures and converging wings therein and depending edges with lateral projections and lugs on the lower edges thereof within the casing; a bottom having apertures therein and adapted to engage the lateral projections and the lugs on the bottom of the said slide; the apertures within the reciprocating slide and the bottom secured thereto being adapted to register with the openings in the casing and the bottom secured thereto for the purpose of permitting passage through the said slide and the wings therein in one direction only when the said slide is at one end of the casing and to permit passage in the opposite direction only when the slide is at the other end of the casing; and an extension integral with the reciprocating slide by means of which the said slide may be moved within the casing.

In witness whereof I hereunto set my signature in the presence of the subscribing witnesses.

ANDREW C. DOUGLASS.

Witnesses:
F. A. MEYER,
F. G. NEIL,
D. G. BEHRENS.